W. ODELL.
PNEUMATIC TIRE.
APPLICATION FILED MAR. 10, 1909.
948,903.
Patented Feb. 8, 1910.
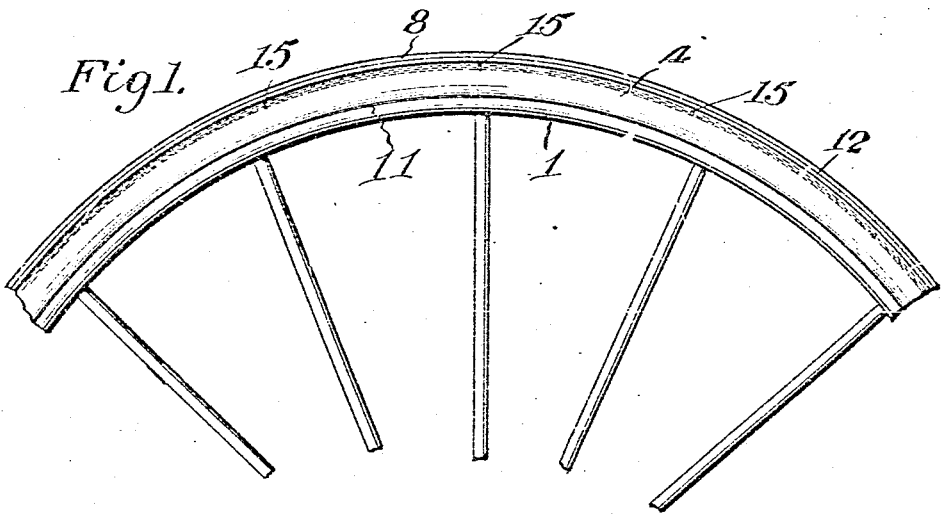
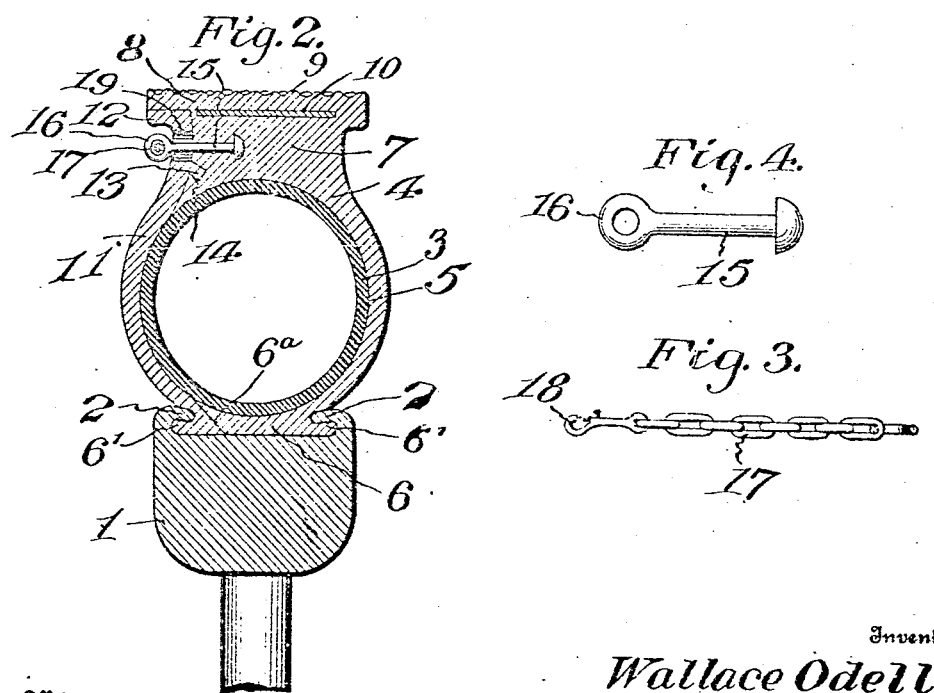
Inventor
Wallace Odell
By Victor J. Evans
Attorney
Witnesses:
Joe. P. Wahler
C. C. Hill

UNITED STATES PATENT OFFICE.

WALLACE ODELL, OF TARRYTOWN, NEW YORK.

PNEUMATIC TIRE.

948,903.  Specification of Letters Patent.  Patented Feb. 8, 1910.

Application filed March 10, 1909. Serial No. 482,420.

*To all whom it may concern:*

Be it known that I, WALLACE ODELL, a citizen of the United States, residing at Tarrytown, in the county of Westchester and State of New York, have invented new and useful Improvements in Pneumatic Tires, of which the following is a specification.

This invention relates to pneumatic tires of the double-tube type, and its object is to provide a tire in which the outer tube or shoe is provided with a removable or openable section, which is adapted to be readily and conveniently detached or turned outward to admit of the initial insertion of the inner tube and its subsequent removal for repairs or the substitution of a new tube when occasion requires without detaching the tire from the rim.

Another object of the invention is to provide simple and effective means for holding the detachable or openable section in closed condition, to provide an outer tube or shoe of such construction as to effectually protect the inner tube and reduce to a material extent liability of puncture thereof, and to provide means for preventing access of dirt, grit and moisture to the interior of the tire.

The invention consists of the features of construction, combination and arrangement of parts hereinafter fully described, reference being had to the accompanying drawings, in which:—

Figure 1 is a side elevation of a portion of a wheel equipped with my improved tire. Fig. 2 is a vertical transverse section of the same. Fig. 3 is a detail view of a portion of the flexible holding band or chain. Fig. 4 is a detail view of one of the eye bolts.

Referring to the drawing, 1 designates a wheel rim of the channeled type, having inturned flanges 2 to engage coacting flanges on the tire, which in the form shown is of the clencher type. The tire comprises an inflatable inner tube 3 and an outer tube or shoe 4, the latter having a bore or chamber 5 of proper diameter to receive said inner tube. The outer tube is provided with a base portion 6 which seats within the rim and is formed with flanges 6' to interlock with the aforesaid rim flanges 2. It is also provided with a thickened portion 7 covering the outer surface of the inner tube and a widened tread portion 8, which latter may be formed with a corrugated or other suitably roughened face 9 to secure a firm grip on the road surface and prevent slipping of the tire. A protecting band or plate 10 is preferably embedded in the tread portion around the entire tire to prevent nails and other objects from passing through the tread and puncturing the inner tube. This band or plate may be made of resilient steel or other suitable flexible or resilient punctureproof material.

One portion of the outer tube or shoe is provided with an opening communicating with the bore or chamber 5 and of sufficient size to admit of the insertion and removal of the inner tube when the latter is in a collapsed condition. This opening is formed in the present instance in one side of the shoe and is adapted to be closed by a removable or openable section 11. This section is formed by dividing the shoe on a line through one side of its base and thickened portion 7, the division of the latter extending to the tread 8. The walls of the divided portion of the base have oblique overlapping faces to closely abut and form a scarf joint 6ª to prevent chafing of the adjacent portion of the inner tube. One of the flanges 2 is consequently provided upon the inner edge of the removable section to secure the same within the rim, while the outer edge of said section bears closely against the adjacent side of the thickened portion 7 and is flanged, as shown at 12, to bear against the adjacent surface of the tread 8. A close union between the outer edge of the removable section and outer surface of the body of the shoe is thus secured, but preferably the said removable section is provided with a tongue 13 entering a groove or recess 14 in the body to effectually close the joint so as to prevent the entrance of dirt, grit and moisture to the interior of the tire.

It will be understood from the foregoing description that the removable section may be detached or swung outward as a flap on its confined edge as a pivot to uncover the opening and permit insertion or removal of the inner tube, thus facilitating the repairing of the inner tube if the latter should be punctured or the removal of a worn out inner tube and its replacement by a new one, and that these operations may be effected after the tire has once been applied to the rim without the necessity of removing it from the rim. In order to hold the outer or free edge of the section or flap 11 secured to the body of the shoe to retain said flap or section in closed condition, suitable fastening means are employed. In the present instance, a series of bolts 15, arranged at spaced intervals around the tire, is employed, and these bolts have headed ends embedded in the portion 7 and free ends projecting beyond the latter and formed with eyes 16 for the reception and passage of a flexible retaining band or ring 17, such as a chain, having its ends suitably united, as by providing each end of the chain with a snap hook on the other end thereof. When the outer tube is closed the free ends of the bolts pass through openings 19 in the free edge of the section 11, as shown in Fig. 2. When the inner tube is inflated and expands and the outer tube or shoe expands therewith, the chain or flexible band, which is normally slightly slack, is drawn taut and holds the free edge of the removable or openable section, cover or flap 11 firmly closed so as to keep the tongue 13 fully inserted in the recess 14. It will be observed that the flange 12 and adjacent edge of the tread 8 overhang the projecting ends of the bolts and chains and protect the same to a large extent from injury.

From the foregoing description, it will be seen that my invention provides a tire which protects the inner tube to a maximum extent and permits of its ready application and ready removal for repairs or replacement.

Having thus fully described the invention, what is claimed as new, is:—

1. A tire comprising an outer tube having an opening, an inner tube insertible and removable through said opening, a removable section for closing the opening, retaining devices on the outer tube to extend through said section, and a flexible member engaging said retaining devices to secure said section in closed position.

2. A tire comprising an outer tube having a base provided with flanges and divided at one side to form an opening and a removable section to close the same, an inner tube insertible and removable through said opening, retaining devices on the outer tube to extend through said section, and a flexible member engaging said retaining devices to secure said section in closed position.

3. A tire comprising an outer tube having an opening, an inner tube insertible and removable through said opening, a removable closure for the opening, said outer tube and closure being provided with flanges to engage the rim of the wheel, retaining devices on the outer tube to extend through said closure, and a flexible member engaging said retaining devices to secure said closure in closed position.

4. A tire comprising an outer tube having an opening, an inner tube insertible and removable through said opening, a removable section for closing the opening, retaining devices on the outer tube to extend through said section and provided with eyes, and a flexible securing element threaded through said eyes.

5. A tire comprising an outer tube having a side opening, a thickened outer portion and a widened tread carried by the latter, an inner tube insertible and removable through the opening, an openable section to cover the opening, said section being adapted for attachment at its inner edge with the base of the outer tube to the rim of a wheel and provided with openings at its outer edge, retaining devices held in the thickened portion of the tire and having free ends projecting therefrom to extend through the openings in said section and provided with eyes, and a flexible securing device adapted to be threaded through the eyes.

In testimony whereof I affix my signature in presence of two witnesses.

WALLACE ODELL.

Witnesses:
G. F. VAN TASSEL,
JOHN H. HUBBEL.